US008193285B2

(12) United States Patent
Takahashi et al.

(10) Patent No.: US 8,193,285 B2
(45) Date of Patent: Jun. 5, 2012

(54) BLOCK COPOLYMERS

(75) Inventors: Eiji Takahashi, Ichihara (JP); Shoji Yamaguchi, Ichihara (JP)

(73) Assignee: Nippon Soda Co., Ltd., Tokyo (JP)

(*) Notice: Subject to any disclaimer, the term of this patent is extended or adjusted under 35 U.S.C. 154(b) by 389 days.

(21) Appl. No.: 12/300,512

(22) PCT Filed: May 16, 2007

(86) PCT No.: PCT/JP2007/060076
§ 371 (c)(1),
(2), (4) Date: Feb. 3, 2009

(87) PCT Pub. No.: WO2007/132901
PCT Pub. Date: Nov. 22, 2007

(65) Prior Publication Data
US 2009/0253867 A1 Oct. 8, 2009

(30) Foreign Application Priority Data

May 16, 2006 (JP) .................................. 2006-137083

(51) Int. Cl.
C08F 293/00 (2006.01)
C08F 291/06 (2006.01)
C08L 53/00 (2006.01)
(52) U.S. Cl. ......... 525/299; 525/242; 525/302; 525/303
(58) Field of Classification Search .................. 525/242, 525/286, 287, 293, 294, 298, 299, 302, 303, 525/308, 309
See application file for complete search history.

(56) References Cited

U.S. PATENT DOCUMENTS

| | | | |
|---|---|---|---|
| 5,264,527 A | 11/1993 | Varshney et al. | |
| 5,677,387 A * | 10/1997 | Bayard et al. | 525/299 |
| 5,945,491 A | 8/1999 | Matyjaszewski et al. | |
| 6,861,103 B2 | 3/2005 | Chang et al. | |
| 2002/0042474 A1 | 4/2002 | Court et al. | |
| 2007/0015890 A1 * | 1/2007 | Yamaguchi et al. | 526/319 |

FOREIGN PATENT DOCUMENTS

| | | |
|---|---|---|
| EP | 0 408 429 A1 | 1/1991 |
| EP | 0524054 A1 * | 1/1993 |
| EP | 1 167 439 A1 | 1/2002 |
| JP | 05-310867 A | 11/1993 |
| JP | 2000-53734 A | 2/2000 |
| JP | A 2003-258296 | 9/2003 |
| JP | 2005-97624 A | 4/2005 |
| JP | A-2005-118936 | 5/2005 |
| JP | A-2006-327853 | 12/2006 |
| JP | 2007-70453 A | 3/2007 |
| WO | WO-98/04605 A1 | 2/1998 |
| WO | WO-2004/106398 A1 | 12/2004 |

OTHER PUBLICATIONS

Burguiere, C. et al Macromolecules vol. 34 (2001) pp. 4439-4450.*
Machine translation of JP 2000-53734.*
Machine translation of JP 05310867.*
Tisato Kajiyama et al., "Depth Dependence of the Surface Glass Transition Temperature of a Poly(styrene-block-methyl methacrylate) Diblock Copolymer Film on the Basis of Temperature-Dependent X-ray Photoelectron Spectroscopy," Macromolecules, vol. 28, pp. 3482-3484, 1995.
Boeker et al., "Large Scale Domain Alignment of a Block Copolymer from Solution Using Electric Fields," Macromolecules, vol. 35, pp. 1319-1325, 2002.
Boeker et al., "Nanoscopic Surface Patterns from Functional ABC Triblock Copolymers," Macromolecules, vol. 34, pp. 7477-7488, 2001.

* cited by examiner

Primary Examiner — Irina S Zemel
Assistant Examiner — Jeffrey Lenihan
(74) Attorney, Agent, or Firm — Oliff & Berridge, PLC

(57) ABSTRACT

It is to provide a block copolymer that can form a microphase separation structure even with a small molecular size, and that can form a microphase separation structure with a small domain size.

It is a block copolymer represented by the formula A-C-B (wherein A represents a segment which is a homopolymer or random or block copolymer consisting of at least 1 kind or repeat units represented by formula (II);

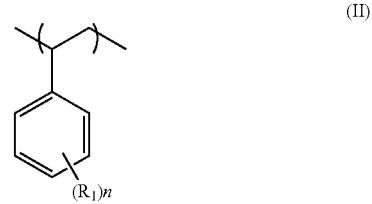

B represents a segment which is a homopolymer, or random or block copolymer consisting of at least 1 kind of repeat units represented by formula (III);

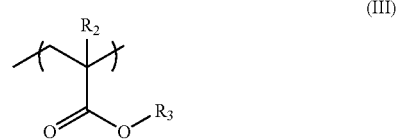

C represents A, B or A-B; however, at least 1 segment of each A has a water-repellent group, or at least 1 segment of each B has a polar group); which block copolymer has a mass average molecular weight of 50,000 or less, and that can form a microphase separation structure.

4 Claims, 2 Drawing Sheets

[Fig.1]
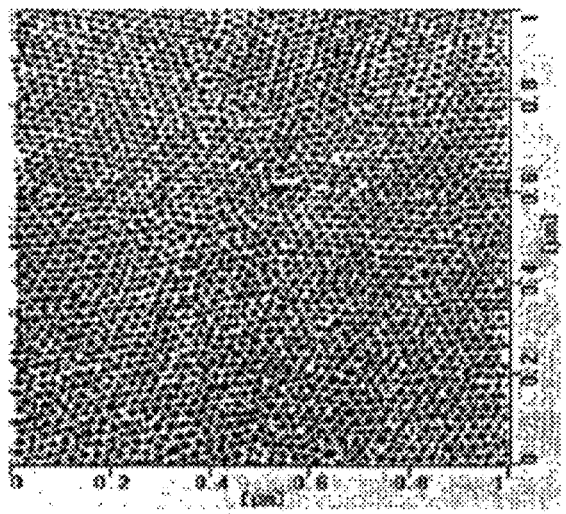
[Fig.2]
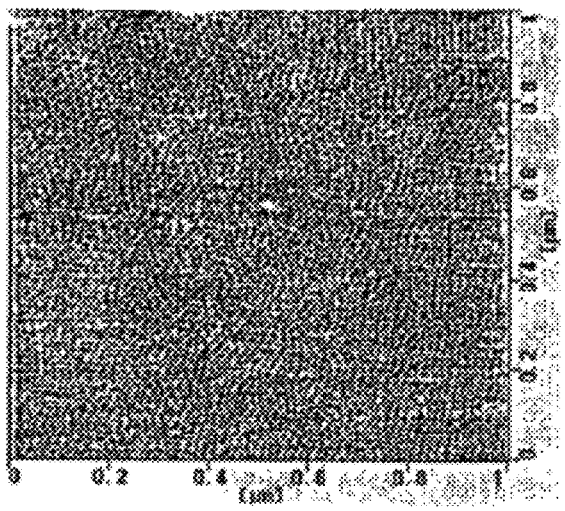
[Fig.3]
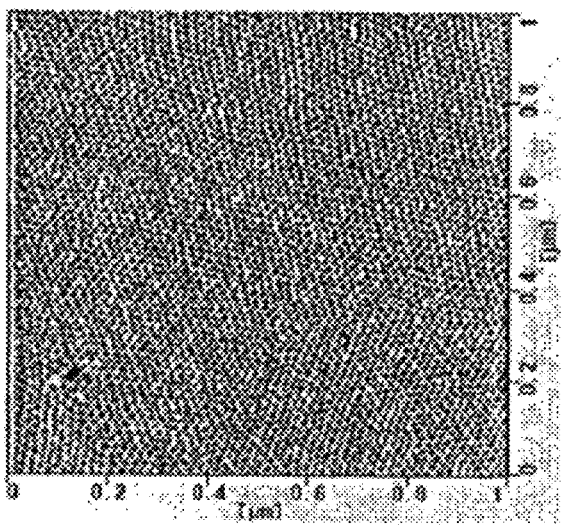

[Fig.4]
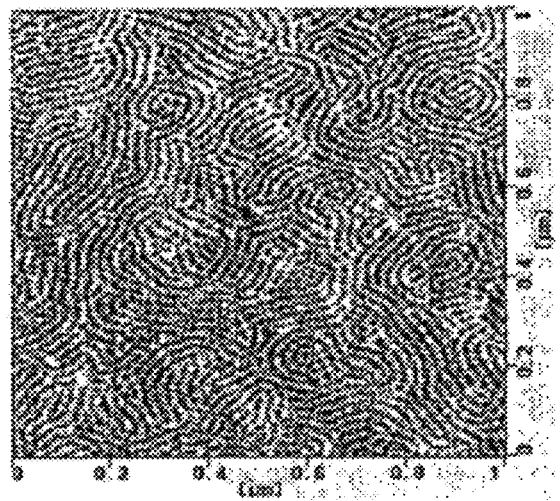
[Fig.5]
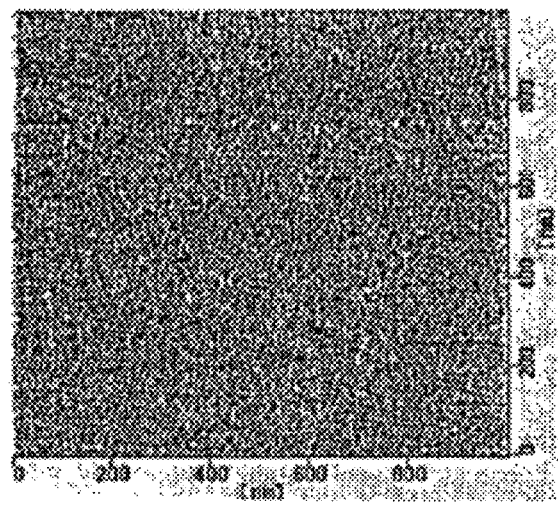
[Fig.6]
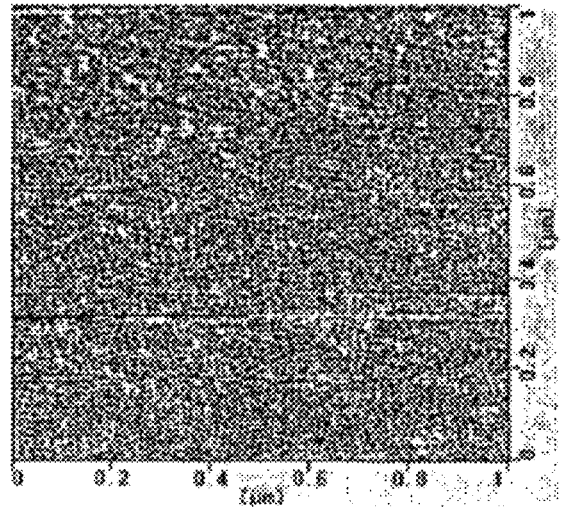

BLOCK COPOLYMERS

CROSS-REFERENCE TO PRIOR APPLICATION

This is the U.S. National Phase Application under 35 U.S.C. §371 of International Patent Application No. PCT/JP2007/060076 filed May 16, 2007, which claims the benefit of Japanese Patent Application No. 2006-137083 filed May 16, 2006, both of which are incorporated by reference herein. The International Application was published in Japanese on Nov. 22, 2007 as WO2007/132901 a1 under PCT Article 21(2).

TECHNICAL FIELD

The present invention relates to a block copolymer, more specifically to a block copolymer expressing a microphase separation structure.

BACKGROUND ART

Block copolymers are used, or are considered to be applied as molded resin, binding agent/adhesive agent, support of adhesive tape, resin with improved shock-resistance, tackifier, dispersant, surface modifier, compatibilizer, separation membrane, elastic fiber, high molecular surfactant, pharmaceutical preparation, medical material, antifouling paint, superhydrophobic membrane, etc. Further, applications in the field of electric and electronic, including photoelectric conversion element, light emitting element, display, light modulation element, organic FET element, capacitor, liquid-crystal oriented film, reversible thermosensitive recording medium, hologram optical element, optical recording medium, film for smart windows, and anisotropic conductive material, are considered recently.

Among these, it is considered to use the microphase separation structure of a block copolymer as a mask, to transcript its pattern, processing at a nanoscale base, and to apply for producing recording devices such as flash memory, optical recording disk, and hard disk, or light emitting elements (for example, see Patent Document 1). In this case, as the microphase separation structure is used as a mask, it is desirable that the size of the domain of the phase separation structure can be controlled arbitrarily.

Generally, a microphase separation structure is a phenomenon observed in a polymer which molecular weight is several tens of thousands or more, and has a narrow molecular weight distribution, wherein polymers with different polarity or being incompatible with each other are bound as a block. For example, sea-island structure, columnar structure, and lamellar structure are known, and the domain size is about 10 to 100 nm. The microphase separation structure are not expressed when the polarity difference between polymers having different polarity is too small. On the contrary, when the difference is too large, not a microphase separation structure, but a macrophase separation structure is expressed. Therefore, an appropriate polarity difference is required. Normally, the domain structure in the microphase separation structure is determined by the composition ratio of a block copolymer, and the domain size is determined by the molecular weight of the block copolymer.

Further, it is known that an intermediate layer called the interface layer exists in the periphery of the domain of the microphase separation structure. The interface layer tends to be larger when the polarity difference among polymers having different polarity is smaller.

The most commonly known block copolymer expressing a microphase separation structure can be exemplified by a styrene/methyl methacrylate block copolymer. The interface layer of this styrene/methyl methacrylate block copolymer is relatively large. Further, for example, when trying to make the domain size of the sea-island structure expressed by this block copolymer expresses to be about 20 nm or less, it is necessary to reduce the molecular weight to several ten thousands or less. However, in this case, there is a problem that almost no microphase separation structure is observed.

Recently, materials for use in the electric and electronic field have a high-density, as represented by recording devices, and when applying the microphase separation of a block copolymer for manufacturing such devices, it is necessary to make the domain size or interface layer as small as possible. Thus, such block copolymers were awaited.

Block copolymers forming microphase separation structure are exemplified in the following.

Patent Document 2 describes a method to form a microphase separation structure by using a diblock copolymer wherein polystyrene chain and poly(methyl methacrylate) chain are linked. The diblock copolymer herein used has an average molecular weight of 65,000 (it is unclear whether it is a mass average molecular weight or number average molecular weight), and the ratio of poly(methylmethacrylate) chain in the copolymer is 20 wt % or 80 wt %. After forming a film of the block copolymer on a basal plate, heating at 210° C. for 4 hours, and further at 135° C. for 40 hours, a microphase separation structure is expressed. The size of the dotted parts of the microphase separation structure (domain size) is 30 nm at minimum.

Patent Document 3 describes a method to form a microphase separation structure by using a diblock copolymer consisting of polystylene and polyisoprene. The diblock copolymer has a mass average molecular weight (Mw) of 290,000, Mw/Mn=1.12, and volume ratio of polyisoprene is 29.7%. By making a film of the diblock copolymer on a basal plate, and heating at 170° C. for hours, a microphase separation structure having a cylinder structure is expressed. The size of the cylinder consisted of polyisoprene is 20 nm.

Nonpatent Documents 1 and 2 describe methods to form a microphase separation structure by using a triblock copolymer consisting of polystyrene (S), poly(2-hydroxyethyl methacrylate)(H) and poly(methyl methacrylate) (M). The documents describe those with a number average molecular weight (Mn) of 82,000 to 134,000, Mw/Mn=1.02 to 1.04. Among these, by forming a film of those with a number average molecular weight (Mn) of 134,000 on a basal plate, and heating at 190° C. for 5 days, a microphase separation structure is expressed. The size of dots is about 20 nm.

However, as it is seen from these documents, so far, there was no example of a block copolymer with a mass average molecular weight or number average molecular weight of 50,000 or less, and which forms a clear microphase separation structure.

[Patent Document 1] Japanese Laid-Open Patent Application No. 2003-258296

[Patent Document 2] Japanese Laid-Open Patent Application No. 2005-118936

[Patent Document 3] Japanese Laid-Open Patent Application No. 2006-327853

[Non Patent Document 1] Macromolecules 2001, 34,7477-7488

[Non Patent Document 2] Macromolecules 2002, 35,1319-1325

DISCLOSURE OF THE INVENTION

Object to be Solved by the Invention

The object of the present invention is to provide a block copolymer that can form a microphase separation structure with a small domain size, and that can form a microphase separation structure even with a small molecular weight.

Means to Solve the Object

The present inventors made a keen study to solve the above object. They made a part of a styrene repeat structure to be a repeat structure consisting of styrene having a water-repellant group, or they made a part of a (meth)acrylic ester repeat structure to be a repeat structure consisting of (meth)acrylic ester and/or (meth)acrylic ester having a polar group, and further combined the above methods in a styrene/(meth) acrylic ester block copolymer. Thus, they found out that it is possible to adjust appropriately the polarity difference of each block of a block copolymer, and that a block copolymer which can form a microphase separation structure with a small domain size and which can form a microphase separation structure even with a small molecular weight can be produced. The present invention has been thus completed.

Specifically, the present invention relates to (1) a block copolymer that can form a microphase separation structure, having a mass average molecular weight of 50,000 or less, represented by the general formula (I) A-C-B (I)
(wherein A represents a segment which is a homopolymer or random or block copolymer consisting of at least 1 kind of repeat units represented by formula (II)

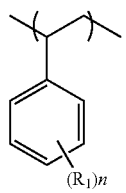

(wherein $R_1$ represents a hydrogen atom, fluorine atom, $(R_4)_3Si$ group, $C_{1-6}$ linear, branched or cyclic alkyl group, or $C_{1-6}$ linear, branched, or cyclic alkyl fluoride group; n represents a integer of 1 to 5; $R_4$ represents independently $C_{1-6}$ linear, branched or cyclic alkyl group, $C_{6-14}$ aryl group, $C_{7-16}$ arylalkyl group or heterocyclic group);
B represents a segment which is a homopolymer, or random or block copolymer consisting of at least 1 kind of repeat units represented by formula (III),

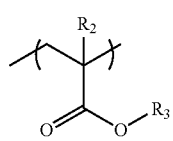

(wherein $R_2$ represents a hydrogen atom or $C_{1-6}$ linear alkyl group; $R_3$ represents a hydrogen atom, $C_{1-6}$ linear, branched or cyclic alkyl group or $R_5(R_6)_m$ group; $R_5$ represents $C_{1-20}$ linear, branched or cyclic alkylene group; $R_6$ represents OH group, $C_{1-6}$ linear, branched or cyclic alkyloxy group, COOH group, $COCH_3$ group, acetylacetone group, phosphate group, amino group, nitro group, cyano group, or epoxy group; $R_5(R_6)_m$ represents that $m \times R_6$ are bound to $R_5$; m represents an integer of 1 or more);
C represents A, B or A-B; however, at least 1 segment of each A has a water-repellent group, or at least 1 segment of each B has a polar group);

(2) the block copolymer according to (1), wherein formula (I) is A-A-B, A-B-B, or A-A-B-B (wherein each A and each B may consists of the same repeat units, or of different repeat units);

(3) a microphase separation structure formed with the block copolymer according to (1) or (2);

(4) the microphase separation structure according to (3), wherein the microphase separation structure has a domain size of 20 nm or less;

(5) the microphase separation structure according to (3) or (4), wherein the microphase separation structure consists of a sea-island structure having a domain size of 20 nm or less;

(6) the microphase separation structure according to any one of (3) to (5), wherein the microphase separation structure is a thin film;

(7) a method for forming a microphase separation structure using a block copolymer represented by formula (I) and having a mass average molecular weight of 50,000 or less;

(8) the method for forming a microphase separation structure according to (7), wherein the microphase separation structure has a domain size of 20 nm or less;

(9) the method for forming a microphase separation structure according to (7) or (8), wherein the microphase separation structure consists of a sea-island structure having a domain size of 20 nm or less;

(10) a method for producing a microphase separation structure by annealing a block copolymer, wherein the method comprises the steps of heating the polymer to a temperature which is higher than the glass transition temperature by 30 to 200° C., returning to the annealing temperature by taking 1 to 5 hours, and keeping the annealing temperature for 1 to 20 hours;

(11) the method for producing a microphase separation structure according to (10), wherein the block copolymer comprises a segment consisting of styrene repeat units;

(12) the method for producing a microphase separation structure according to (10) or (11), wherein the block copolymer comprises a segment consisting of styrene repeat units and (meth)acrylic ester repeat units;

(13) the method for producing a microphase separation structure according to any one of (10) to (12), wherein the block copolymer is a block copolymer represented by the formula (I);

(14) the method for producing a microphase separation structure according to (13), wherein the mass average molecular weight of the block copolymer is 50,000 or less;

(15) a microphase separation structure produced by the method according to any one of (10) to (14);

(16) the microphase separation structure according to (15), wherein the microphase separation structure is a thin film.

BRIEF DESCRIPTION OF DRAWINGS

[FIG. 1]
It is a figure showing the results of observing with an atom force microscope (AFM) in a phase mode, the surface of a basal plate annealed by applying a PSt/P (MA/MMA) block copolymer of Example 1.

[FIG. 2]

It is a figure showing the results of observing with an atom force microscope (AFM) in a phase mode, the surface of a basal plate annealed by applying a PSt/P (MA/MMA) block copolymer of Example 2.

[FIG. 3]

It is a figure showing the results of observing with an atom force microscope (AFM) in a phase mode, the surface of a basal plate annealed by applying a PSt/P (HEMA/MMA) block copolymer of Example 3.

[FIG. 4]

It is a figure showing the results of observing with an atom force microscope (AFM) in a phase mode, the surface of a basal plate annealed by applying a PSt/P (HEMA/MMA) block copolymer of Example 4.

[FIG. 5]

It is a figure showing the results of observing with an atom force microscope (AFM) in a phase mode, the surface of a basal plate annealed by applying a PSt/PMMA diblock copolymer of Comparative Example 1.

[FIG. 6]

It is a figure showing the results of observing with an atom force microscope (AFM) in a phase mode, the surface of a basal plate annealed by applying a PSt/P(MA/MMA) diblock copolymer of Comparative Example 2.

BEST MODE OF CARRYING OUT THE INVENTION (Definition of Substituents)

Each substituent of the block copolymers represented by the formula (I) of the present invention is as follows:

1) Repeat Units Represented by Formula (II)

$R_1$ represents a hydrogen atom, fluorine atom, $(R_4)_3Si$ group, $C_{1-6}$ linear, branched or cyclic alkyl group, or $C_{1-6}$ linear, branched or cyclic alkyl fluoride group.

$R_4$ in "$(R_4)_3Si$ group" each independently represents $C_{1-6}$ linear, branched or cyclic alkyl group, $C_{6-14}$ aryl group, $C_{7-16}$ arylalkyl group or heterocyclic group.

"$C_{1-6}$ linear, branched or cyclic alkyl group" includes linear or branched alkyl group such as methyl, ethyl, propyl, isopropyl, butyl, isobutyl, sec-butyl and tert-butyl, pentyl, hexyl; and cyclic alkyl group such as cyclopropyl, cyclobutyl, cyclopentyl, cyclohexyl, cyclopropylmethyl, cyclobutylmethyl, and cyclopentylmethyl.

"$C_{6-14}$ aryl group" includes phenyl, xylyl, 1-naphtyl, 2-naphthyl, biphenyl, 2-indenyl, and 2-anthryl.

"$C_{7-16}$ arylalkyl group" includes benzyl, phenetyl, phenylpropyl, phenylbutyl and phenylhexyl.

"Heterocyclic group" include the following: thiophene-2-yl, thiophene-3-yl, furan-2-yl, furan-3-yl, pyrrole-1-yl, pyrrole-2-yl, imidazole-1-yl, imidazole-2-yl, pyrazole-1-yl, pyrazole-3-yl, thiazole-2-yl, thiazole-4-yl, oxazole-2-yl, oxazole-4-yl, isooxazole-3-yl, isooxazole-4-yl, pyrimidine-2-yl, pyrimidine-4-yl, pyridine-2-yl, pyridine-3-yl, pyrrolidine-2-yl, pyrrolidine-3-yl, benzothiophene-2-yl, benzothiophene-3-yl, benzofuran-2-yl, benzofuran-3-yl, indole-2-yl, indole-3-yl, benzoimidazole-1-yl, benzoimidazole-2-yl, benzothiazole-2-yl, benzoxazole-2-yl, quinoline-2-yl, quinoline-3-yl, isoquinoline-1-yl, isoquinoline-3-yl, 1,3,4-thiadiazole-2-yl, and morpholine-4-yl.

"$C_{1-6}$ linear, branched or cyclic alkyl fluoride group" includes fluoromethyl, trifluoromethyl, pentafluoropropyl, 2-fluorocyclopentyl, 3-fluorohexyl, and 3,5-difluorohexyl.

$(R_4)_3Si$ group includes trimethylsilyl, triethylsilyl, tripropylsilyl, tri-1-propylsilyl, dimethyl-1-propylsilyl, diethyl-1-propylsilyl, tributylsilyl, t-butyldimethylsilyl, pentyldimethylsilyl, hexyldimethylsilyl, phenyl $C_1$-$C_6$ alkylsilyl, 1-naphtyl-$C_1$-$C_6$ alkylsilyl, 2-naphtyl-$C_1$-$C_6$ alkylsilyl, triphenylsilyl, tri-p-xylylsilyl, tribenzylsilyl, diphenylmethylsilyl, t-butyldiphenylsilyl, dimethylphenylsilyl, thiophene-2-yl-$C_1$-$C_6$ alkylsilyl, and pyrimidine-2-yl-$C_1$-$C_6$ alkylsilyl.

"Water-repellent group" represents all substituents $R_1$, except hydrogen atom.

2) Repeat Units Represented by Formula (III)

$R_2$ represents a hydrogen atom, or $C_{1-6}$ linear alkyl group.

$R_3$ represents a hydrogen atom, $C_{1-6}$ linear, branched or cyclic alkyl group, $R_5(R_6)_m$ group.

"$C_{1-6}$ linear alkyl group" and "$C_{1-6}$ linear, branched or cyclic alkyl group" represent the same alkyl groups as $C_{1-6}$ linear, branched, or cyclic alkyl group in the repeat units represented by the above formula (II).

$R_5$ of "$R_5(R_6)_m$ group" represents $C_{1-20}$ linear, branched or cyclic alkylene group. Further, $R_6$ represents OH group, $C_{1-6}$ linear, branched, or cyclic alkyloxy group, COOH group, $COCH_3$ group, acetylacetone group, phosphate group, amino group, nitro group, cyano group, or epoxy group. $R_5(R_6)_m$ represents that $m \times R_6$ is bound to $R_5$. m is an integer of 1 or more, and generally 1 to 3.

$C_{1-6}$ linear, branched or cyclic alkyl group of "$C_{1-6}$ linear, branched or cyclic alkyloxy group" represents the same alkyl group as $C_{1-6}$ linear, branched, or cyclic alkyl group in the repeat units represented by the above formula (II).

"$C_{1-20}$ linear, branched or cyclic alkylene group" includes methylene, ethylene, trimethylene, hexamethylene, decamethylene, icosamethylene, 1,3-cyclopentylene, and 1,4-cyclohexylene.

"Polar group" represents all substituents $R_3$ except $C_{1-6}$ linear, branched or cyclic alkyl group.

(Block Copolymer)

Block copolymers represented by the following formula (I) of the present invention are explained in the following.

$$A\text{-}C\text{-}B \quad (I)$$

1) Summary of Polymers

As segment C is A, B or A-B, block copolymers represented by the formula (I) are classified into the following three types.

First type: A-A-B
Second type: A-B-B
Third type: A-A-B-B

Herein, each A and each B are a homopolymer, or random or block copolymer. In A-A or B-B in the above structural formula, for each A or each B, the repeat units may be the same or different. When each A or each B are the same, there is no difference between A and A, or B and B, and may be represented by the structural formula A-B.

However, at least one segment of A has a water-repellent group, or at least one segment of B has a polar group. That means that the case where at least one segment of A has a water-repellent group and at least one segment of B has a polar group is also encompassed.

Styrene repeat units having a water-repellent group and styrene repeat units not having a water-repellent group may be a random copolymer or a block copolymer. It is the same for (meth)acrylic ester repeat units having a polar group, and (meth)acrylic ester repeat unit not having a polar group.

Model cases encompassed in each type are shown in the following. However, it is the cases where each segment A, B and C consists of 6 repeat units. Block copolymers encompassed in the present invention are not limited to these examples. Herein, each numeral denotes the following:

$a_1$: a styrene repeat unit not having a water-repellent group
$a_2$: a styrene repeat unit having a water-repellent group
$b_1$: a (meth)acrylic ester repeat unit not having a polar group $b_2$: a (meth)acrylic ester repeat unit having a polar group Examples of the First Type (A-A-B)

$(a_1a_1a_1a_1a_1a_1)-(a_2a_2a_2a_2a_2a_2)-(b_1b_1b_1b_1b_1b_1)$
$(a_1a_1a_1a_1a_1a_1)-(a_1a_1a_1a_1a_1a_1)-(b_1b_2b_1b_1b_2b_2)$
$(a_1a_2a_2a_1a_2a_1)-(a_1a_1a_1a_1a_1a_1)-(b_1b_2b_1b_1b_2b_2)$
$(a_1a_2a_1a_1a_2a_2)-(a_2a_2a_2a_2a_2a_2)-(b_1b_1b_1b_1b_1b_1)$

Examples of the Second Type (A-B-B)

$(a_1a_1a_1a_1a_1a_1)-(b_2b_2b_2b_2b_2b_2)-(b_1b_1b_1b_1b_1b_1)$
$(a_1a_2a_1a_1a_2a_2)-(b_1b_1b_1b_1b_1b_1)-(b_1b_1b_1b_1b_1b_1)$
$(a_1a_1a_1a_1a_1a_1)-(b_2b_2b_2b_2b_2b_2)-(b_1b_2b_1b_1b_2b_2)$

Examples of the Third Type (A-A-B-B)

$(a_1a_1a_1a_1a_1a_1)-(a_2a_2a_2b_2b_2b_2)-(b_1b_1b_1b_1b_1b_1)$

When the segments at both ends are both a homopolymer or block copolymer, it is preferred that the intermediate segment has a repeat unit with a water-repellent group or polar group.

The mass average molecular weight (Mw) of a block copolymer of the present invention is 50,000 or less, and a block copolymer having a mass average molecular weight of 40,000 or less, 30,000 or less, 20,000 or less can be prepared according to need. Herein, the mass average molecular weight (Mw) is a level calculated by a Gel Permeation Chromatography (GPC) using polystyrene as a standard. Even with such molecular weight, a microphase separation structure with a small domain size can be formed consistently. Further, the molecular weight distribution (ratio of mass average molecular weight (Mw) and number average molecular weight (Mn) (Mw/Mn)) is not particularly limited, and is preferably 1.3 or less, more preferably 1.2 or less.

Limitation of contamination amount of alkaline metal, alkaline earth metals, transition metal, etc. in the block copolymer of the present invention, differs by the intended purpose, while it is usually 100 ppm or less, preferably 50 ppm or less, and more preferably 1 ppm or less. Particularly, when it is used for a semiconductor device, the limit of contamination amount of metals is 100 ppb or less, and preferably 50 ppb or less.

As for the content ratio of a segment consisted of styrene repeat unit represented by formula (II) and a segment consisted of (meth)acrylic ester repeat unit represented by formula (III), in a copolymer of the present invention, it is preferred that the segment consisted of styrene repeat units is 2 to 98 mol % in the whole block copolymer, preferably 5 to 95 mol %, and more preferably 10 to 90 mol %.

2) Segment A

Segment A is a homopolymer, or random or block copolymer consisted of at least one kind of repeat units represented by formula (II):

$$\text{(II)}$$

Substituent $R_1$ is as defined in the above.

Monomers which are the raw materials include the following compounds.

Styrene;

fluorine-containing styrene;

2-fluorostyrene, 3-fluorostyrene, 2,3-difluorostyrene, 2,4-difluorostyrene, 2,3'-difluorostyrene, 3,3'-difluorostyrene, 2,3,4-trifluorostyrene, 2,2',3-trifluorostyrene, 2,2',3,3'-tetrafluorotyrene, etc.

Alkyl group-containing styrene;

2-methylstyrene, 3-methylstyrene, 4-methylstyrene, 2,3-dimethylstyrene, 2,4-dimethylstyrene, 2,2'-dimethylstyrene, 2,3'-dimethylstyrene, 3,3'-dimethylstyrene, 2,3,4-trimethylstyrene, 2,2',3-trimethylstyrene, 2,3,3'-trimethylstyrene, 2,2',4-trimethylstyrene, 3,3',4-trimethylstyrene, 2,2',3,3'-tetramethylstyrene, 2,2',3,4-tetramethylstyrene, 2,3,3',4-tetramethylstyrene, pentamethylstyrene, 2-ethylstyrene, 3-ethylstyrene, 4-ethylstyrene, 2,3-diethylstyrene, 2,4-diethylstyrene, 2,2'-diethylstyrene, 2,3'-diethylstyrene, 3,3'-diethylstyrene, 2,3,4-triethylstyrene, 2,2',3-triethylstyrene, 2,3,3'-triethylstyrene, 2,2',4-triethylstyrene, 3,3',4-triethylstyrene, 2,2',3,3'-tetraethylstyrene, 2,2',3,4-tetraethylstyrene, 2,3,3',4-tetraethylstyrene, pentaethylstyrene, 2-t-butylstyrene, 3-t-butylstyrene, 4-t-butylstyrene, 2,3-di-t-butylstyrene, 2,4-di-t-butylstyrene, 2,2'-di-t-butylstyrene, 2,3'-di-t-butylstyrene, 3,3'-di-t-butylstyrene, 2,3,4-tri-t-butylstyrene, 2,2',3-tri-t-butylstyrene, 2,3,3'-tri-t-butylstyrene, 2,2',4-tri-t-butylstyrene, 3,3',4-tri-t-butylstyrene, 2,2',3,3'-tetra-t-butylstyrene, 2,2',3,4-tetra-t-butylstyrene, 2,3,3',4-tetra-t-butylstyrene, penta-t-butylstyrene, 2-cyclohexylstyrene, 3-cyclohexylstyrene, 4-cyclohexylstyrene, 2,3-dicyclohexylstyrene, 2,4-dicyclohexylstyrene, 2,2'-dicyclohexylstyrene, 2,3'-dicyclohexylstyrene, 3,3'-dicyclohexylstyrene, 2,3,4-tricyclohexylstyrene, 2,2',3-tricyclohexylstyrene, 2,3,3'-tricyclohexylstyrene, 2,2',4-tricyclohexylstyrene, 3,3',4-tricyclohexylstyrene, 2,2',3,3'-tetracyclohexylstyrene, 2,2',3,4-tetracyclohexylstyrene, 2,3,3',4-tetracyclohexylstyrene, pentacyclohexylstyrene, etc.

Aryl group-containing styrene;

2-phenylstyrene, 3-phenylstyrene, 4-phenylstyrene, 2,3-diphenylstyrene, 2,4-diphenylstyrene, 2,2'-diphenylstyrene, 2,3'-diphenylstyrene, 3,3'-diphenylstyrene, 2,3,4-triphenylstyrene, 2,2',3-triphenylstyrene, 2,3,3'-triphenylstyrene, 2,2',4-triphenylstyrene, 3,3',4-triphenylstyrene, 2,2',3,3'-tetraphenylstyrene, 2,2',3,4-tetraphenylstyrene, 2,3,3',4-tetraphenylstyrene, pentaphenylstyrene, etc.

Fluoroalkyl group-containing styrene;

2-trifluoromethylstyrene, 3-trifluoromethylstyrene, 4-trifluoromethylstyrene, 2,3-bis(trifluoromethyl)styrene, 2,4-bis(trifluoromethyl)styrene, 2,2'-bis(trifluoromethyl)styrene, 2,3'-bis(trifluoromethyl)styrene, 3,3'-bis(trifluoromethyl)styrene, 2,3,4-tris(trifluoromethyl)styrene, 2,2',3-tris(trifluoromethyl)styrene, 2,3,3'-tris(trifluoromethyl)styrene, 2,2',4-tris(trifluoromethyl)styrene, 3,3',4-tris(trifluoromethyl)styrene, 2,2',3,3'-tetrakis(trifluoromethyl)styrene, 2,2',3,4-tetrakis(trifluoromethyl)styrene, 2,3,3',4-tetrakis(trifluoromethyl)styrene, pentakis(trifluoromethyl)styrene, etc.

Silyl group containing-styrene;

2-trimethylsilylstyrene, 3-trimethylsilylstyrene, 4-trimethylsilylstyrene, 2,3-bis(trimethylsilyl)styrene, 2,4-bis(trimethylsilyl)styrene, 2,2'-bis(trimethylsilyl)styrene, 2,3'-bis(trimethylsilyl)styrene, 3,3'-bis(trimethylsilyl)styrene, 2,3,4-tris(trimethylsilyl)styrene, 2,2',3-tris(trimethylsilyl)styrene, 2,3,3'-tris(trimethylsilyl)styrene, 2,2',4-tris(trimethylsilyl)styrene, 3,3',4-tris(trimethylsilyl)styrene, 2,2',3,3'-tetrakis(trimethylsilyl)styrene, 2,2',3,4-tetrakis(trimethylsilyl)styrene, 2,3,3',4-tetrakis(trimethylsilyl)styrene, pentakis(trimethylsilyl)styrene, 2-triethylsilylstyrene, 3-triethylsilylstyrene, 4-triethylsilylstyrene, 2,3-bis(triethylsilyl)styrene, 2,4-bis(triethylsilyl)styrene, 2,2'-bis(triethylsilyl)styrene, 2,3'-bis(triethylsilyl)styrene, 3,3'-bis(triethylsilyl)styrene, 2,3,4-tris (triethylsilyl)styrene, 2,2',3-tris(triethylsilyl)styrene, 2,3, 3'-tris(triethylsilyl)styrene, 2,2',4-tris(triethylsilyl) styrene, 3,3',4-tris(triethylsilyl)styrene, 2,2',3,3'-tetrakis (triethylsilyl)styrene, 2,2',3,4-tetrakis(triethylsilyl) styrene, 2,3,3',4-tetrakis(triethylsilyl)styrene, pentakis (triethylsilyl)styrene, etc.

Among these, preferred are monosubstituted styrenes, and particularly preferred are monoalkyl-substituted styrene, monotrifluoromethyl-substituted styrene, and monosilyl-substituted styrene. Specific examples include 4-t-butylstyrene, 4-trifluoromethylstyrene, and 4-trimethylsilylstyrene.

3) Segment B

Segment B is a homopolymer, or random or block copolymer consisted of at least one kind of repeat units represented by formula (III):

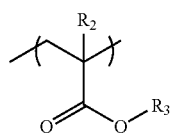

Substituents $R_2$ and $R_3$ are as described in the above.

Monomers which are the raw material include the following compounds.

(meth)acrylic acid;

Hydroxy group-containing (meth)acrylic acid ester (meth) acrylic acid hydroxymethyl, (meth)acrylic acid 1-hydroxyethyl, (meth)acrylic acid 2-hydroxyethyl, (meth) acrylic acid 1-hydroxypropyl, meth(acrylic) acid 2-hydroxypropyl, (meth)acrylic acid 3-hydroxypropyl, (meth)acrylic acid 1-hydroxybutyl, (meth)acrylic 2-hydroxybutyl, (meth)acrylic acid 3-hydroxybutyl, (meth) acrylic acid 4-hydroxybutyl, (meth)acrylic acid 2-dihydroxyethyl, etc.

Alkyloxy group-containing (meth)acrylic acid ester;

Methoxyethyl(meth)acrylate, ethoxyethyl(meth)acrylate, methoxypropyl(meth)acrylate, ethoxyethoxyethyl (meth) acrylate, etc.

acetyl group-containing(meth)acrylic acid ester;

acetylmethyl(meth)acrylate, 2-acetylethyl(meth)acrylate, 3-acetylpropyl(meth)acrylate, etc.

COOH group-containing (meth)acrylic acid ester;

Hydroxycarbonylmethyl(meth)acrylate, 2-hydroxycarbonylethyl(meth)acrylate, 3-hydroxycarbonylpropyl(meth) acrylate, etc. (meth)acrylic acid esters containing other polar groups;

Aminomethyl(meth)acrylate, 2-aminoethyl(meth)acrylate, glycidyl(meth)acrylate, etc.

Among these, preferred are (meth)acrylic acid, hydroxy group-containing (meth)acrylic acid ester. Most preferred are (meth)acrylic acid, (meth)acrylic acid 2-hydroxyethyl.

4) Segment C

Segment C may be segment A or segment B, or may be A-B, wherein segment A is bound with segment B.

Monomers, which are the raw materials, are the same as the above styrene monomer or (meth)acrylic ester monomer.

5) Composition Rate of Repeat Units Having a Water-repellent Group

In case of a block copolymer wherein the segment consisted of styrene repeat units has a water-repellent group, but the segment consisted of (meth)acrylic acid ester repeat units does not have a polar group, the ratio of styrene repeat units having a water-repellent group within the segment consisted of styrene units is preferred to be 5 to 100 mol %, more preferably 10 to 95 mol %, and still more preferably 20 to 90 mol %.

Further, in case of a block copolymer wherein the segment consisted of styrene repeat units has a water-repellent group, and the segment consisted of (meth)acrylic acid ester repeat units has a polar group, the ratio of styrene repeat units having a water-repellent group within a block chain consisted of styrene repeat units depends on the content of polar group and the like in the block chain consisted of (meth)acrylic acid ester repeat units. However, generally, it is preferred to be more than 0 and 100 mol % or less, more preferably more than 0 and 95 mol % or less, and still more preferably more than 0 and 90 mol % or less.

With such ratio, it is possible to form more accurately a microphase separation structure with a small domain size.

6) Composition Rate of Repeat Unit Having a Polar Group

In case of a block copolymer wherein the segment consisted of (meth)acrylic acid ester repeat units has a polar group, but the segment consisted of styrene repeat units does not have a water-repellent group, the ratio of (meth)acrylic acid ester repeat unit having a polar group within the segment consisted of (meth)acrylic ester repeat units is preferred to be 5 to 100 mol %, more preferably 10 to 90 mol %, and still more preferably 15 to 80 mol %.

Further, in case of a block copolymer wherein the segment consisted of styrene repeat units has a water-repellent group, and the segment consisted of (meth)acrylic acid ester repeat units has a polar group, the ratio of (meth)acrylic acid ester repeat units having a polar group within a block chain consisted of (meth)acrylic ester repeat units depends on the content of water-repellent group and the like in the block chain consisted of styrene repeat units. However, generally, it is preferred to be more than 0 and 100 mol % or less, more preferably more than 0 and 90 mol % or less, and still more preferably more than 0 and 80 mol % or less.

With such ratio, it is possible to form more accurately a microphase separation structure with a small domain size.

(Method for Producing Block Copolymers)

The block copolymer of the present invention can be easily synthesized by a known living polymerization method. Living radical polymerization is preferred as it is not necessary to protect a functional group, and living anion polymerization is preferred as the composition or molecular weight can be strictly controlled.

To obtain a polymer having (meth)acrylic acid repeat units and/or (meth)acrylic acid ester repeat units having a polar group by living anion polymerization method, it can be obtained by protecting these polar groups for polymerization, followed by deprotection. Moreover, it can be obtained by introducing a polar group after polymerization. Introduction of protection groups, deprotection, and introduction of polar groups can be performed by conventionally known methods. For example, carboxyl group can be produced by protecting by making a tertiary ester with a tertiary carbon such as t-butyl group, and then performing deprotection. Further, it can be produced by protecting with alkylsilyl groups such as trimethylsilyl group and triethylsilyl group, and then performing deprotection. Furthermore, hydroxy group can be produced by protecting with alkylsilyl groups such as trimethylsilyl group and triethylsilyl group, and then performing deprotection. Alternatively, it can be produced by polymerizing a monomer having an epoxy group, and performing ring opening with acid, etc. Furthermore, acetyl acetone group can be produced by using a hydroxy group-containing polymer and allowing to act diketene. Moreover, deprotection for producing functional groups of hydroxy group and carboxyl group can be performed directly after block copolymer polymerization, or it can be performed after adding for example photo-acid-generating agent or thermal acid-generating agent, and performing deprotection by generating acid after film formation. When the solubility of a block copolymer to a solvent is low, or when using a block copolymer on a membrane, the latter is preferred.

(Microphase Separation Structure)

The microphase separation structure formed by a block copolymer of the present invention, has a sea-island structure, pillar structure, lamellar structure, etc. The microphase separation structure relates to a substance having a microphase separation structure. The substance can be exemplified by a thin film, but not limited to this. In case of a sea-island structure, the domain size (island diameter) is 20 nm or less, and one with a size of 15 nm or less can be also prepared. The domain size relates to a level obtained by observing the basal plate with an atomic force microscope (AFM) in a phase mode, after filtrating the solution obtained by dissolving the block copolymer in a solvent, spin coating on the basal plate, and heating and annealing. In the present invention, a domain size of 20 nm or less means that 50% or more of the domain is 20 nm or less. However, it is preferred that 70% or more, more preferably 80% or more, and still more preferably 90% or more is within that range.

(Method of Producing a Microphase Separation Structure)

The method of producing a microphase separation structure by using a block copolymer is generally, in case of producing a thin film, a method comprising dissolving a block copolymer into an appropriate solvent, coating on a basal plate by a spin coating method, etc., drying to form a film, and annealing the film at about the glass transition temperature of the polymer for a long period of time. However, it happens that a clear microphase separation structure cannot be formed by such method.

The microphase separation structure using a block copolymer of the present invention can be obtained by heating the thin film coated by a spin coating method, etc. to a temperature higher than the glass transition temperature by 30 to 200° C., preferably by 50 to 150° C., more preferably by 70 to 120° C.; returning to a certain annealing temperature by taking 1 to 5 hours, preferably 1 to 2 hours, and retaining it at the annealing temperature for 1 to 30 hours, preferably 2 to 20 hours, and more preferably 5 to 15 hours. Herein, the annealing temperature relates to a temperature which is higher or lower than the glass transition temperature of the polymer used by 30° C. It is preferred to be a temperature higher than the glass transition temperature by 0 to 30° C., more preferably by 10 to 30° C. As for the method for returning the temperature to the annealing temperature, it is important to return the temperature by taking a certain time, while the method is optional. It can be cooled continuously, slowly by a certain temperature gradient, or it can be cooled in stages. When cooling drastically, there is a risk that a clear phase separation structure cannot be obtained. Therefore, a method of gradually returning the temperature from a temperature that is 20 to 200° C. higher than the glass transition temperature to the annealing temperature under vacuum is preferred.

The method can be applied to not only for a block copolymer represented by formula (I), but also to general block copolymers.

As for a solvent used for dissolving a block copolymer, a solvent that is appropriate from the view point that it has good solubility for a block copolymer having a polar group, it can form an uniform film when coating by a spin coating method, etc., or it has less solvent residue when dried after coating, and its boiling point is 100° C. or higher, is preferred. It can be used alone or as a mixed solvent. Particularly, a ketone solvent or ester solvent is preferred, and aryl solvent can be used according to the type of polymer to be dissolved. Specifically, cyclohexane, propylene glycolmonomethylether acetate, ethyl lactate, γ-butylolactone, ε-caprolactone, xylene can be exemplified. When preparing a semiconductor device, particularly preferred are propylene glycolmonomethylether acetate, ethyl lactate, etc. By considering the safety of the actual manufacturing line, those having a low firing point are favorable, thus secondary or higher petroleum is preferred, and tertiary petroleum or higher is more preferred.

The amount of the solvent used differs by the thickness of the film, and when forming for example a thin film, while it is preferred to use a solvent so that the block copolymer becomes generally 15 wt % or less, preferably 8 wt % or less, and more preferably 2 wt % or less.

Further, it is possible to fix the microphase separation structure at room temperature after annealing the molten block copolymer to separate the microphase. Moreover, the molten block copolymer can be molded to a desired shape by injection molding, hot press, transfer molding, etc., followed by annealing to form a microphase separation structure.

As for a mask to transcript a pattern, by using a block copolymer of the present invention, as it is stated in the above, it can be obtained by forming a film or compact of the block copolymer to form a microphase separation structure, selectively removing one polymer phase, and forming a porous film or porous structure having a nanometer order by using the resultant. As for a method for selectively removing one polymer phase from a microphase separation structure, examples include a method employing the difference of thermal degradability, degradability against energy line, difference of dry etching etc. between both polymer phases.

EXAMPLES

The present invention will be explained in detail by referring to the Examples, while the technical scope of the present invention is not limited to these exemplifications.

Meanwhile, abbreviations used in the following denote the following.

[Abbreviation]
Monomers
  St: styrene
  BSt: p-tert-butylstyrene
  MA: (meth)acrylic acid
  MMA: methyl methacrylate
  HEMA: 2-hydroxyethyl methacrylate
  ECHMA: 1-ethylcyclohexyl methacrylate
  SiOEMA: 2-trimethylsiloxyethyl methacrylate
Polymers
  PSt: polystyrene
  PMA: polymethacrylic acid
  PMMA: polymethylmethacrylate
  PHEMA: poly(hydroxyethyl methacrylate)
  PBSt: poly(p-tert-butoxystyrene)
  PSt/P(MA/MMA): Block copolymer of PSt, and a random copolymer of MA and MMA
  PSt/PMA/PMMA: Triblock copolymer of PSt, PMA, and PMMA
  PSt/P(HEMA/MMA): Block copolymer of PSt, and a random copolymer of HEMA and MMA
  PBSt/PMMA: Diblock copolymer of PBSt and PMMA
  PBSt/P(MA/MMA): Block copolymer of PBSt, and a random copolymer of MA and MMA
  PSt/PHEMA/PMMA: Triblock copolymer of PSt, PHEMA, and PMMA Solvent/Initiator/Additive
  THF: Tetrahydrofuran
  DPE: 1,1-diphenylethylene
  NBL: 1.0 M normal butyllithium solution
  LiCl: 3.8 wt % lithium chloride tetrahydrofuran solution
  DBuMg: 1.0 M dibutyl magnesium heptane solution
  DEtZn: 1.0 M diethyl zinc heptane solution Example 1

PSt/P (MA/MMA) Block Copolymer

Under nitrogen atmosphere, 1.07 g (2.57 mmol) of NBL was added to 454.8 g of THF supplemented with 1.92 g (1.72 mmol) of LiCl. The mixture was stirred for 30 min at room temperature, to remove water etc. in the system. After cooling the resultant to −40° C., 0.73 g (1.03 mmol) of DBuMg, 23.6 g (226.3 mmol) of St monomer were added. 0.7 g (1.68 mmol) of NBL was added to the resultant solution to initiate polymerization. After maturing for 10 min, 1.03 g (5.71 mmol) of DPE was added, and stirred for 10 min. Next, a mixture of 2.0 g (10.2 mmol) of ECHMA monomer, 4.43 g (44.2 mmol) of MMA monomer, and 0.44 g (0.59 mmol) of DEtZn was added and stirred further for 90 min. Methanol was added to this reaction solution to stop the reaction, and reprecipitation operation was performed with methanol solvent, and filtrated. By air-drying the obtained filtrate, a PSt/P (ECHMA/MMA) block copolymer was obtained (Mw=28400, Mw/Mn=1.12, St/ECHMA/MMA=80/4/16 mol).

The obtained block copolymer was dissolved in a mixed solvent of toluene and ethanol to make a 10 wt % solution, and deprotection reaction was performed at 70° C. for 180 min by employing sulfuric acid. The reaction solution was washed with water, and then, reprecipitation operation was performed with methanol solvent, followed by filtration. By air-drying the obtained filtrate, PSt/P (MA/MMA) block copolymer A was obtained (MW=27400, MW/Mn=1.12, St/MA/MMA=80/4/16 mol).

This polymer A was dissolved in cyclohexane, to prepare a solution of 1.5 wt %. By employing the solution, and spin coating at a rotation of 3500 rpm, a thin film of a thickness of 43 nm was formed on a 2×2 cm-silicone wafer. The film-coated basal plate was placed into a vacuum oven heated at 190° C., vacuated, cooled to 120° C. by taking 1 hour, and retained for 12 hours. The obtained sample was measured in AFM phase mode, and a clear sea-island shape phase separation structure with a diameter of about 15 nm was observed (FIG. 1).

Example 2

Pst/P (MA/MMA) Block Copolymer

PSt/P (MA/MMA) block copolymer B was obtained by a similar method as Example 1 (Mw=16400, Mw/Mn=1.12, St/MA/MMA=80/4/16 mol).

A sample with a film thickness of 37 nm was obtained by employing this polymer B by a similar method as Example 1, and was measured by a AFM phase mode. A clear sea-island shape phase separation structure with a diameter of about 7 nm was observed (FIG. 2).

Example 3

Pst/P (HEMA/MMA) Block Copolymer

Under nitrogen atmosphere, 21.4 g (205.1 mmol) of St monomer was added into 40.3 g of THF and 164.2 g of toluene, and cooled to −40° C. Next, 1.09 g (2.73 mmol) of NBL was added and stirred for 30 min. Further, 1.74 g (9.65 mmol) of DPE was added and stirred for 10 min. Then, a mixture of 3.82 g (18.9 mmol) of SiOEMA monomer, 2.82 g (28.2 mmol) of MMA monomer, 3.32 g (2.98 mmol) of LiCl, 1.21 g (1.63 mmol) of DEtZn and 11.9 g of THF was added and stirred for 90 min. Methanol was added to this reaction solution to stop the reaction, and a reprecipitation operation was performed with a methanol solvent, and filtrated. By air-drying the obtained filtrate, PSt/P (SiOEMA/MMA) block copolymer was obtained (Mw=14900, Mw/Mn=1.09, St/SiOEMA/MMA=81/8/11 mol).

The obtained polymer was dissolved in THF to make a 10 wt % solution, and deprotection reaction was performed by employing hydrochloric acid at room temperature for 30 min. The reaction solution was washed with water, reprecipitation operation was conducted with methanol solvent, and filtrated. By air-drying the obtained filtrate, PSt/P (HEMA/MMA) block copolymer C was obtained (Mw=14600, Mw/Mn=1.09, St/HEMA/MMA=81/8/11 mol).

A sample with a film thickness of 43 nm was obtained by employing this polymer C by a similar method as Example 1, and was measured by a AFM phase mode. A clear sea-island shape phase separation structure with a diameter of about 8 nm was observed (FIG. 3).

Example 4

PSt/P (HEMA/MMA) Block Copolymer

By employing PSt/P (HEMA/MMA) block copolymer D (Mw=12900, Mw/Mn=1.05, St/HEMA/MMA=80/16/4 mol) with a similar molecular weight, synthesized with a similar method as Example 3, a sample with a film thickness of 37 nm was obtained by a similar method as Example 1, and measured by a AFM phase mode. A clear columnar shape phase separation structure with a width of about 7 nm was observed (FIG. 4).

Example 5

PSt/P (HEMA/MMA) Block Copolymer

PSt/P (HEMA/MMA) block copolymer E was obtained by a similar method as Example 3 (Mw=17400, Mw/Mn=1.04, St/HEMA/MMA=80/8/12 mol).

A sample with a film thickness of 38 nm was obtained by employing this polymer E, by a similar method as Example 3, and was measured by a AFM phase mode. A clear sea-island shape phase separation structure with a diameter of about 13 nm was observed.

Example 6

PBSt/PMMA Diblock Copolymer

Under nitrogen atmosphere, 1.02 g (2.45 mmol) of NBL was added to 454.5 g of THF supplemented with 1.88 g (1.69 mmol) of LiCl. The mixture was stirred for 30 min at room temperature, to remove water etc. in the system. After cooling the resultant to −40° C., 0.71 g (1.0 mmol) of DBuMg, 34.0 g (212.2 mmol) of BSt monomer were added. 0.76 g (1.82 mmol) of NBL was added to the resultant solution, stirred at −40° C. for 10 min. Then, 1.01 g (5.60 mmol) of DPE was added and stirred for 10 min. Next, a mixture of 5.20 g (51.9 mmol) of MMA monomer and 0.45 g (0.60 mmol) of DEtZn was added and stirred further for 90 min at −40° C. Methanol was added to this reaction solution to stop the reaction, and reprecipitation operation was performed with methanol solvent, and filtrated. By air-drying the obtained filtrate, PBSt/PMMA diblock copolymer F was obtained (Mw=27600, Mw/Mn=1.13, BSt/MMA=80/20 mol).

A sample with a film thickness of 48 nm was obtained by employing this polymer F, by a similar method as Example 1, and was measured by a AFM phase mode. A clear sea-island shape phase separation structure with a diameter of about 11 nm was observed.

Example 7 pBSt/P(MA/MMA) Block Copolymer

Under nitrogen atmosphere, 1.05 g (2.51 mmol) of NBL was added to 455.6 g of THF supplemented with 1.90 g (1.70 mmol) of LiCl. The mixture was stirred for 30 min at room temperature, to remove water etc. in the system. After cooling the resultant to −40° C., 0.72 g (1.01 mmol) of DBuMg, 34.5 g (215.3 mmol) of BSt monomer were added. 0.74 g (1.77 mmol) of NBL was added to the resultant solution, stirred at −40° C. for 10 min. Then, 1.09 g (6.00 mmol) of DPE was added and stirred for 10 min. Next, a mixture of 1.95 g (9.93 mmol) of ECHMA monomer, 4.47 g (44.6 mmol) of MMA monomer and 0.44 g (0.59 mmol) of DEtZn was added and stirred further for 90 min at −40° C. Methanol was added to this reaction solution to stop the reaction, and reprecipitation operation was performed with methanol solvent, and filtrated. By air-drying the obtained filtrate, a PBSt/P (ECHMA/MMA) block copolymer was obtained (Mw=28400, Mw/Mn=1.09, BSt/ECHMA/MMA=80/4/16 mol).

The obtained polymer was dissolved in a mixed solvent of toluene and ethanol to make a 10 wt % solution, and deprotection reaction was performed by employing sulphuric acid at 70° C. for 180 min. The reaction solution was washed with water, reprecipitation operation was conducted with methanol solvent and filtrated. By air-drying the obtained filtrate, PBSt/P (MA/MMA) block copolymer G was obtained (Mw=27700, Mw/Mn=1.08, BSt/MA/MMA=80/4/16 mol).

A sample with a film thickness of 47 nm was obtained by employing this polymer G, by a similar method as Example 1, and was measured by a AFM phase mode. A clear sea-island shape phase separation structure with a diameter of about 11 nm was observed.

Example 8

PSt/PHEMA/PMMA Triblock Copolymer

Under nitrogen atmosphere, 22.7 g (218.1 mmol) of St monomer was added to 40.4 g of THF and 161.3 g of toluene, and cooled to −40° C. Next, 0.6 g (1.44 mmol) of NBL was added, stirred for 30 min, 0.89 g of DPE (4.94 mmol) was added and stirred for 10 min. Then, a mixture of 2.01 g (9.9 mmol) of Si OEMA monomer, 1.84 g of LiCl (1.65 mmol), 1.38 g of DEtZn (1.86 mmol) was added to this reaction solution and stirred for 60 min. Next, a mixture of 4.01 g (40.1 mmol), 0.36 g of DEtZn (0.48 mmol) and 11.4 g of THF was added to this reaction solution and further stirred for 60 min. Methanol was added to this reaction solution to stop the reaction, and reprecipitation operation was performed with methanol solvent, and filtrated. By air-drying the obtained filtrate, a PSt/PSiOEMA/PMMA triblock copolymer was obtained (Mw=27500, Mw/Mn=1.11, St/SiOEMA/MMA=81/4/15 mol).

The obtained polymer was dissolved in THF to make a 10 wt % solution, and deprotection reaction was performed by employing hydrochloric acid at room temperature for 30 min. The reaction solution was washed with water, reprecipitation operation was conducted with methanol solvent and filtrated. By air-drying the obtained filtrate, PSt/PHEMA/PMMA triblock copolymer H was obtained (Mw=27300, Mw/Mn=1.10, St/HEMA/MMA=81/4/15 mol).

A sample with a film thickness of 38 nm was obtained by employing this polymer H by a similar method as Example 1, and measured by a AFM phase mode. A clear sea-island shape phase separation structure with a diameter of about 18 nm was observed.

Example 9

PSt/PMA/PMMA Triblock Copolymer

Under nitrogen atmosphere, 21.9 g (210.3 mmol) of St monomer was added to 42.5 g of THF, and 160.3 g of toluene, and cooled to −40° C. Next, 0.59 g (1.41 mmol) of NBL was added, stirred for 30 min, 0.98 g (5.44 mmol) of DPE was added and stirred for 10 min. Then, a mixture of 0.96 g (4.89 mmol) of ECHMA monomer, 1.75 g (1.57 mmol) of LiCl, and 1.29 g (1.73 mmol) of DEtZn was added to the reaction solution and stirred for 60 min. Next, a mixture of 4.44 g (44.3 mmol) of MMA monomer, 0.51 g (0.69 mmol) of DEtZn and 11.1 g of THF was added to the reaction solution and further stirred for 60 min. Methanol was added to this reaction solution to stop the reaction, and reprecipitation operation was performed with methanol solvent, and filtrated. By air-drying the obtained filtrate, a PSt/PECHMA/PMMA triblock copolymer was obtained (Mw=28400, Mw/Mn=1.06, St/ECHMA/MMA=81/2/17 mol).

The obtained triblock copolymer was dissolved in mixed solvent of toluene and ethanol to make a 10 wt % solution, and deprotection reaction was performed by employing sulphuric acid at 70° C. for 180 min. The reaction solution was washed with water, reprecipitation operation was conducted with methanol solvent and filtrated. By air-drying the obtained filtrate, PSt/PMA/PMMA triblock copolymer I was obtained (Mw=28200, Mw/Mn=1.06, St/MA/MMA=81/2/17 mol).

A sample with a film thickness of 45 nm was obtained by employing this polymer I, by a similar method as Example 1, and measured by a AFM phase mode. A clear sea-island shape phase separation structure with a diameter of about 19 nm was observed.

Comparative Example 1

Comparison of Example 1 and PSt/PMMA Diblock Copolymer

By employing PSt/PMMA diblock copolymer J (Mw=32000, Mw/Mn=1.04, St/MMA=80/20 mol) with a similar molecular weight, a sample with a film thickness of 46 nm was obtained by a similar method as Example 1, and measured by a AFM phase mode. No clear phase separation structure was observed (FIG. 5).

Comparative Example 2

Comparison of Annealing Conditions with Example 2

PSt/P (MA/MMA) block copolymer B (Mw=16400, Mw/Mn=1.12, St/MA/MMA=80/4/16 mol) was dissolved in cyclohexane to prepare a solution of 1.5 wt %. By spin coating the solution at a rotation of 3500 rpm, a thin film of a film thickness of 43 nm was formed on a 2×2 cm-silicone wafer. The film-formed basal plate was placed into a vacuum oven, vacuated, heated to 120° C., and retained for 12 hours. The obtained sample was measured by a AFM phase mode, while no clear sea-island separation structure was observed (FIG. 6).

[Industrial Applicability]

By employing the block copolymer of the present invention, it is possible to form a microphase separation structure even when the molecular weight of the block copolymer is small, and a microphase separation structure with a small domain size can be formed. Therefore, a mask to transcript a pattern can be produced, and electronic materials such as recording devices having a high density and a clean pattern can be produced with the mask.

The invention claimed is:

1. A microphase separation structure having a domain size of 20 nm or less, formed with a block copolymer having a mass average molecular weight of 50,000 or less, represented by formula (I)

$$A\text{-}C\text{-}B \quad (I)$$

wherein:

A represents a segment which is a homopolymer or random or block copolymer consisting of at least 1 kind of repeat units represented by formula (II)

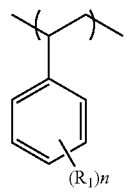

(II)

wherein:

$R_1$ represents a
  hydrogen atom,
  fluorine atom,
  $(R_4)_3Si$ group,
  $C_{1-6}$ linear, branched or cyclic alkyl group, or $C_{1-6}$ linear, branched, or cyclic alkyl fluoride group;
n represents an integer of 1 to 5; and
$R_4$ represents independently a
  $C_{1-6}$ linear, branched, or cyclic alkyl group,
  $C_{6-14}$ aryl group,
  $C_{7-16}$ arylalkyl group, or
  heterocyclic group;

B represents a segment which is a homopolymer, or a random or block copolymer consisting of at least 1 kind of repeat units represented by formula (III)

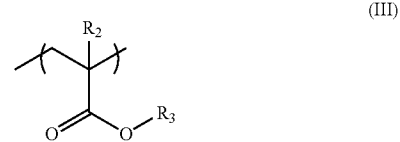

(III)

wherein:

$R_2$ represents a hydrogen atom or $C_{1-6}$ linear alkyl group;

$R_3$ represents a hydrogen atom, $C_{1-6}$ linear, branched, or cyclic alkyl group, or $R_5(R_6)_m$ group;

$R_5$ represents $C_{1-20}$ linear, branched, or cyclic alkylene group;

$R_6$ represents OH group, $C_{1-6}$ linear, branched, or cyclic alkyloxy group, COOH group, $COCH_3$ group, acetylacetone group, phosphate group, amino group, nitro group, cyano group, or epoxy group;

$R_5(R_6)_m$ represents that $m \times R_6$ are bound to $R_5$; and
m represents an integer of 1; and C represents A, B, or A-B; however, at least 1 segment of each A has a water-repellent group, or at least 1 segment of each B has a polar group;

the microphase separation structure consists of a sea-island structure or a pillar structure; and 80 to 98 mol% of the block copolymer of formula (I) consists of styrene repeat units.

2. The microphase separation structure according to claim 1, wherein formula (I) is A-A-B, A-B-B, or A-A-B-B wherein each A and each B may consist of the same repeat units, or of different repeat units.

3. The microphase separation structure according to claim 1, wherein the microphase separation structure is a sea-island structure.

4. The microphase separation structure according to claim 1, wherein the microphase separation structure is a thin film.

* * * * *